N. GÖTHBERG.
FLY OR INSECT TRAP.
APPLICATION FILED MAR. 29, 1911.
1,043,419.
Patented Nov. 5, 1912.
2 SHEETS—SHEET 1.
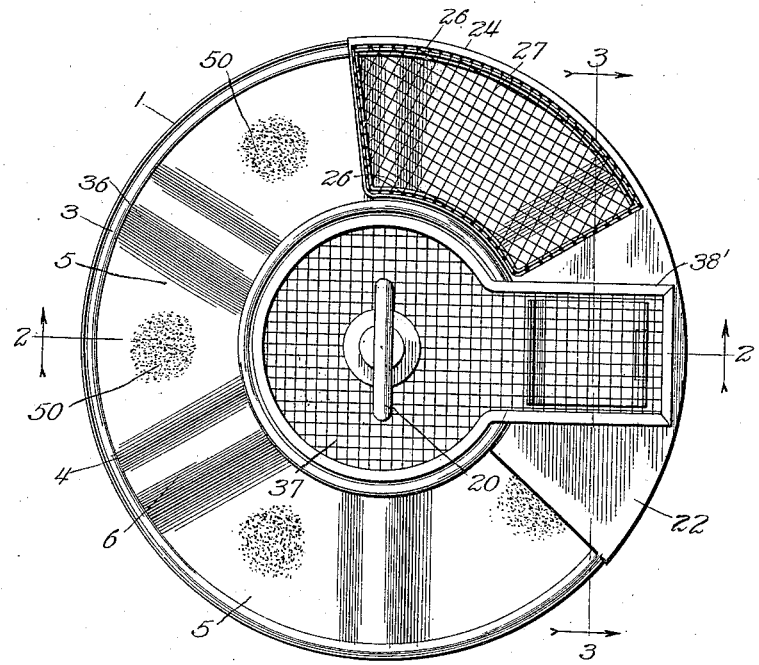
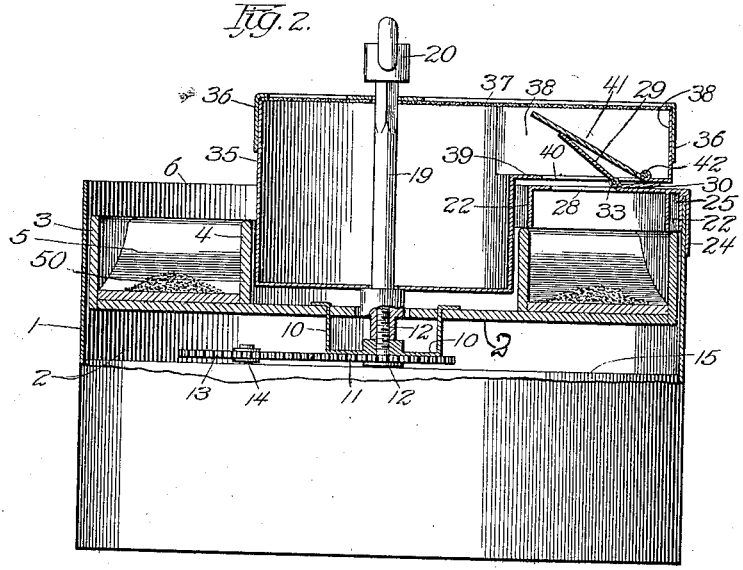
Witnesses:
Robert H. Weir
Charles J. Cobb
Inventor
Nathanael Göthberg
by Nice & Nice
Attys.

N. GÖTHBERG.
FLY OR INSECT TRAP.
APPLICATION FILED MAR. 29, 1911.
1,043,419.
Patented Nov. 5, 1912.
2 SHEETS—SHEET 2.
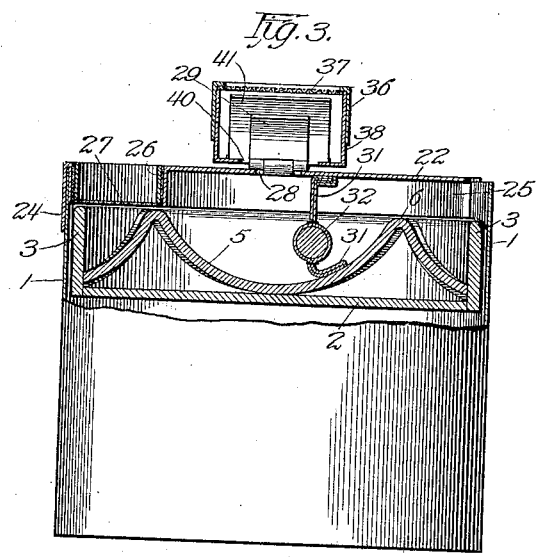
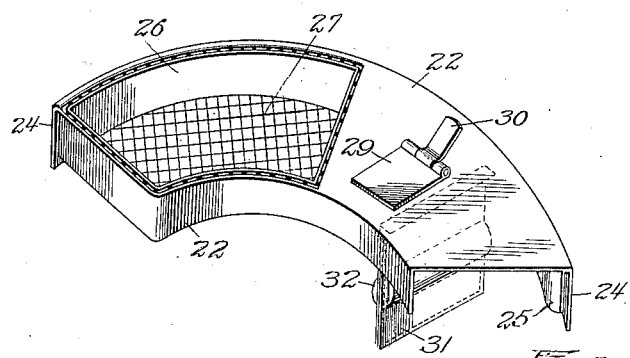
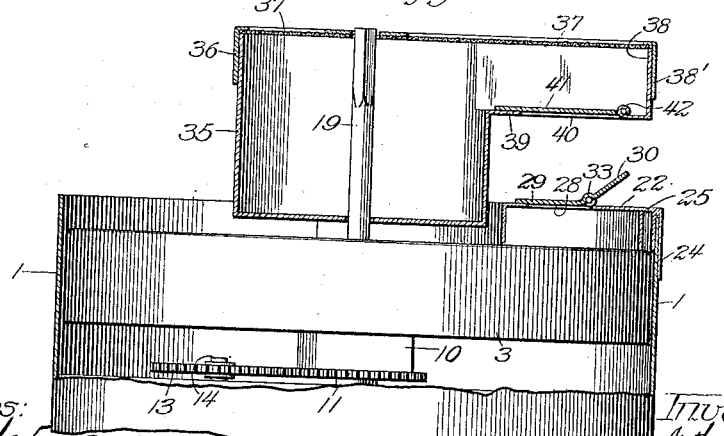

UNITED STATES PATENT OFFICE.

NATHANAEL GÖTHBERG, OF CHICAGO, ILLINOIS.

FLY OR INSECT TRAP.

1,043,419.  Specification of Letters Patent.  Patented Nov. 5, 1912.

Application filed March 29, 1911. Serial No. 617,682.

*To all whom it may concern:*

Be it known that I, NATHANAEL GÖTHBERG, a citizen of the United States, residing at Chicago, in the county of Cook and State of Illinois, have invented certain new and useful Improvements in Fly or Insect Traps, of which the following is a description.

My invention belongs to that general class of devices known as traps or the like, and relates particularly to a device for catching or entrapping flies or other insects, and has among its objects the production of a simple, durable, efficient and satisfactory trap of the kind described for use wherever found applicable.

To this end my invention consists in the novel construction, arrangement and combination of parts herein shown and described, and more particularly pointed out in the claims.

In the drawings, wherein like reference characters indicate like or corresponding parts, Figure 1 is a horizontal sectional view of my improved form of trap. Fig. 2 is a view of the same, showing the upper part of the trap in vertical section, taken substantially on line 2, 2 of Fig. 1. Fig. 3 is a view taken substantially on line 3, 3 of Fig. 1 showing the upper part of the trap in vertical section. Fig. 4 is a perspective view of a portion of the same removed, and Fig. 5 is a sectional view substantially similar to Fig. 2, showing the receiving receptacle partially removed for emptying.

Referring to the drawings, in which my preferred form of device is shown, 1 represents a casing of suitable material, within which is arranged a movable part 2, provided with flanges or extended parts 3, 4, within which is arranged a corrugated part formed with ribs 6 and with depressions 5, making a plurality of pockets. The bait is placed in one or more of the pockets, the kind of bait depending upon the insect to be caught. If flies, sugar or its equivalent may be used, the same being indicated at 50 in Fig. 1. The part 2 with the bait pockets or receptacles may be termed a "bait receptacle or carrier," the same being movable; as shown, rotatable. The bait receptacle may be supported and rotated in any suitable manner. As shown, it is provided with an extension or base 10 on the bottom, to which is secured a gear 11, the gear being loosely mounted upon the shaft 12. The gear 11 is driven by a gear 13 in mesh therewith, which is driven by a shaft 14 in any suitable manner, a clock work arranged within the casing 15 being very satisfactory for the purpose. The clock work winding shaft 12 may be wound by a key 19, having a thumb piece 20, it being distinctly understood, however, that any equivalent arrangement, such as for example a small motor or the like, may be employed for rotating the bait receptacle.

Arranged on one side of the casing proximate the bait carrier, is a trap 22. The trap may be secured in any suitable manner, as shown, it is provided with a pair of flanges 24 and 25, which may be slipped over and embrace the casing 1. The trap 22 is preferably provided with an extended part, in which is arranged a wire or screen of suitable material 27, the same being maintained in position in proximity to the receptacle by the lining 26. The trap is provided with an opening 28 in the top face thereof, 29 being a door pivotally secured to the top at 33 and provided with an extended end 30. Within the trap is arranged a drop 31 of suitable material preferably flexible, as for example, cloth, 32 being a suitable weight.

Arranged above the track 22 is a receiving cage or receptacle 38, which is preferably extended or enlarged at 35, and provided with a removable top 36, in which is arranged a screen 37 of suitable material. In the bottom 39 of the cage 38 is arranged an opening 40, for which is provided a trap door 41, pivotally secured at 42.

The operation of the device may be briefly described as follows:—Assuming that the pockets of the bait carrier or receptacle 50 contain bait suitable for the insects to be caught, as for example, sugar or molasses for flies, the bait carrier is rotated through gears 11, and 13 from the shaft 14, driven by the clock work or its equivalent. The flies alighting on the bait carrier, which should be driven at a comparatively slow uniform speed, and being busily engaged in feeding at the bait, are carried under the screen 27 before they are aware of the fact that they are entrapped. They are imprisoned in the pocket by the screen 27 and ribs 6, until the pocket in which they are comes under the opening 28 in the trap, and they are prevented from following or continuing in the traveling pocket by the drop 31. However, when the pocket is in position under the opening 28, the pocket is comparatively dark except for the light admitted through the opening, so that they fly toward the light and pass through the openings 28 and 40, which are open as the receiving receptacle or cage rests upon the end 30 of the trap door 29 and holds the same open and that in turn holds the trap door 41 open. In this way the flies are gradually discharged into the receiving cage or receptacle 35. When desired the receiving cage 35 may be removed by removing the thumb nut 20 and lifting the same up, at which time the trap doors 29 and 41 drop. The flies may then be killed in any desired way, as for example, submerging the receptacle in water, or they may be taken out doors and liberated, the top 36 being removable as mentioned. After emptying the receptacle, it is again positioned on the trap, and in positioning, the trap doors 29 and 41 are automatically opened.

Actual trial shows the trap to be very efficient, and it may be noted that the ticking of the clock work or noise of the driving mechanism has a tendency to attract the flies to the device. The trap is a particularly desirable trap to have where there are children, inasmuch as the humane way of disposing of the flies is not as demoralizing to the minds of the children as in the case of traps or fly paper, where the flies are apparently in agony. On the contrary this trap is not only efficient and humane, but is also instructive, inasmuch as children can study the flies and their habits without the demoralizing effects before mentioned.

Having thus described my invention, it is obvious that various immaterial modifications may be made in the same without departing from the spirit of my invention, hence I do not wish to be understood as limiting myself to the exact form, arrangement, construction or combination of parts herein shown and described, or uses mentioned.

What I claim as new and desire to secure by Letters Patent is:—

1. In a trap, a rotatable bait carrier including a disk shaped bottom having a peripheral upright flange and a relatively small concentric upright annular flange, the flanges forming therebetween a bait receptacle, a fly receiving receptacle, the body portion of which is positioned in the space within the inner annular flange, a trap positioned above the bait receptacle having an opening therein, and an overlying hollow arm extension on the fly receiving receptacle having an opening in registration with the opening of the trap, said fly receiving receptacle being removable and a door interposed between the trap and fly receiving receptacle.

2. In a trap, a rotatable bait carrier including a disk shaped bottom having a peripheral upright flange and a relatively small concentric upright annular flange, the flanges forming therebetween a bait receptacle, a fly receiving receptacle, the body portion of which is positioned in the space within the inner annular flange, a trap positioned above the bait receptacle having an opening therein, and an overlying hollow arm extension on the fly receiving receptacle having an opening in registration with the opening of the trap, a door for controlling the openings between the trap and the fly receiving receptacle, means for holding the door opening, and means whereby said door may be released.

3. In a trap, a rotatable bait carrier including a disk shaped bottom having a peripheral upright flange and a relatively small concentric upright annular flange, the flanges forming therebetween a bait receptacle, a fly receiving receptacle, the body portion of which is positioned to rest in the space within the inner annular flange and below the upper edge thereof, a trap positioned above the bait receptacle having an opening therein, an overlying hollow arm extension on the fly receiving receptacle having an opening in registration with the opening of the trap, said trap having a screen overlying the bait receptacle and spaced therefrom.

4. In a trap, a rotatable bait carrier including a disk shaped bottom having a peripheral upright flange and a relatively small concentric upright annular flange, the flanges forming therebetween a bait receptacle, a segmental shaped trap overlying the annular bait receptacle, having an opening, a door for said opening and a screen in advance of the door controlled opening in the direction of travel of the bait receptacle, and a vertically extended weight controlled flexible drop depending from the trap to the rear of said opening, and a fly receptacle arranged in communication with the door controlled opening.

5. In a trap, a rotatable bait carrier including a disk shaped bottom having a peripheral upright flange and a relatively small concentric upright annular flange, the flanges forming therebetween a bait receptacle, a segmental shaped trap overlying the annular bait receptacle, having an opening, a door for said opening and a screen in advance of the door controlled opening in the direction of travel of the bait receptacle, a vertically extended weight controlled flexible drop depending from the trap to the rear of said opening, a fly receptacle arranged in communication with the door controlled opening, a fly receiving receptacle positioned in the space within the inner wall of the annular bait receptacle and having a part overlying the door controlled opening, said fly receiving receptacle also having a door controlled opening in communication with the door controlled opening of the trap.

6. In a device of the kind described and in combination, a casing, a rotatable bait carrier arranged therein, said carrier provided with a plurality of pockets, means for rotating said carrier at a substantially constant rate of speed, a trap arranged on said casing and extended over said carrier, said trap provided with an outlet therefrom with a trap door at said outlet, a detachable cage arranged proximate said trap and provided with an inlet proximate said trap outlet, a trap door for controlling said inlet, means for maintaining one of said trap doors open when the cage and trap are associated in operative relation to each other and means whereby the one trap door will maintain the other open.

7. In a trap, a horizontally disposed rotatable bait receptacle having an upright peripheral flange and transversely extending partitions dividing the receptacle into a plurality of compartments, a casing, the upright walls of which project to a point above the upper edge of the flange of the receptacle, a trap positioned on said upright walls, the trap overlying the bait receptacle and having an inlet opening and an auxiliary screened opening at a point in advance of the door controlled opening in the direction of travel in the receptacle, and a vertically swinging door for the inlet opening.

8. In a trap, a horizontally disposed rotatable bait receptacle having an upright peripheral flange and transversely extending partitions dividing the receptacle into a plurality of compartments, a casing, the upright walls of which project to a point above the upper edge of the flange of the receptacle, a trap positioned on said upright walls, the trap overlying the bait receptacle and having an inlet opening and an auxiliary screened opening at a point in advance of the door controlled opening in the direction of travel in the receptacle, a movable door for the inlet opening, a fly receiving receptacle having a door controlled opening in registration with the door controlled opening of the trap.

9. In a trap, a horizontally disposed rotatable bait receptacle having an upright peripheral flange and transversely extending partitions dividing the receptacle into a plurality of compartments, a casing, the upright walls of which project to a point above the upper edge of the flange of the receptacle, a trap positioned on said upright walls, the trap overlying the bait receptacle and having an inlet opening and an auxiliary screened opening at a point in advance of the door controlled opening in the direction of travel in the receptacle, a door for said opening, a fly receiving receptacle having an opening in registration with the door controlled opening of the trap, a door for said opening of the fly receiving receptacle, the fly receiving receptacle being bodily removable and adapted when in position to automatically maintain both of said doors open.

10. In a trap, a horizontally disposed rotatable bait receptacle having an upright peripheral flange and transversely extending partitions dividing the receptacle into a plurality of compartments, a casing, the upright walls of which project to a point above the upper edge of the flange of the receptacle, a trap positioned on said upright walls, the trap overlying the bait receptacle and having an inlet opening and an auxiliary screened opening at a point in advance of the door controlled opening in the direction of travel in the receptacle, a door for said opening, a fly receiving receptacle having an opening in registration with the door controlled opening of the trap, a door for said opening of the fly receiving receptacle, the fly receiving receptacle being bodily removable and adapted when in position to automatically open the trap door which latter has an operative engagement with the door of the fly receptacle whereby to also maintain its door open.

In testimony whereof, I have hereunto signed my name in the presence of two subscribing witnesses.

NATHANAEL GÖTHBERG.

Witnesses:
ROY W. HILL,
CHARLES I. COBB.

---

Copies of this patent may be obtained for five cents each, by addressing the "Commissioner of Patents, Washington, D. C."